United States Patent [19]

Koper et al.

[11] Patent Number: 4,639,231
[45] Date of Patent: Jan. 27, 1987

[54] RETAINER FOR ELECTRICALLY FIRED GETTER

[75] Inventors: James G. Koper; Bo H. G. Ljung, both of Wayne, N.J.

[73] Assignee: The Singer Company, Little Falls, N.J.

[21] Appl. No.: 778,940

[22] Filed: Sep. 23, 1985

[51] Int. Cl.⁴ ............................................. H01S 3/083
[52] U.S. Cl. ..................................... 445/31; 372/94; 445/29
[58] Field of Search .................. 445/31, 29; 372/94, 372/92, 33, 88

[56] References Cited

U.S. PATENT DOCUMENTS

| | | | |
|---|---|---|---|
| 2,742,662 | 4/1956 | Lyons | 16/85 |
| 3,927,953 | 12/1975 | Zucchinelli | 445/31 |
| 4,159,075 | 6/1979 | Ljung | 228/116 |
| 4,204,302 | 5/1980 | Bing | 445/31 |
| 4,503,543 | 3/1985 | Ljung | 372/94 |
| 4,533,248 | 8/1985 | Baumann | 372/94 |

OTHER PUBLICATIONS

*Selektor*, vol. 5, No. 3, Mar. 1979, 3-02.

Primary Examiner—Nicholas P. Godici
Assistant Examiner—Kurt Rowan
Attorney, Agent, or Firm—T. W. Kennedy

[57] ABSTRACT

Apparatus is disclosed for retaining an electrically fired getter inside a ring laser gyroscope. A groove is formed in a plate, which is hermetically sealed to a hole in the ring laser gyroscope block. The cylindrically shaped getter is placed longitudinally in the groove such that the getter contacts the groove along only two lines. A mousetrap shaped spring preloads the getter against the groove so as to prevent acceleration forces and vibrations from causing pieces of the getter, heater coil or wire to break loose.

7 Claims, 3 Drawing Figures

RETAINER FOR ELECTRICALLY FIRED GETTER

FIELD OF THE INVENTION

This invention relates to ring laser gyroscopes and more particularly to a mechanical retainer for a nonevaporative electrically fired getter to be disposed inside the block of such a gyroscope.

BRIEF DESCRIPTION OF THE PRIOR ART

A getter comprises a pure sintered metallic alloy, typically consisting of titanium and zirconium. The alloy is sintered together with graphite to obtain a gas permeable structure. It is considered "nonevaporative" because no material is evaporated when it is heated to its activation temperature. The getter is disposed within the block of a ring laser gyroscope in communication with the optical cavity of the gyroscope. The purpose of a getter is to have its sintered metallic alloy material combine with unwanted non-noble gas components desorbed from the interior of the gyro optical cavity during storage and operation of the ring laser gyro. The getter is necessary because evacuation does not accomplish a lasting cleanliness of the lasing gas. In order to maintain a long lifelength of the ring laser gyroscope, it is important that the optical cavity remain filled with only noble gases, during operation of the gyroscope.

A getter is somewhat oxidized during handling It needs to be activated by heating it to a high temperature, which may typically be 900° C. for one or two minutes. This treatment, called firing, in a vacuum causes impurities on the surface of each grain in the getter to diffuse towards the interior. It also deliberates hydrogen which may have been absorbed due to contact with water vapor. The surface is thereby cleaned and is reactivated to absorb more contaminating gas molecules. Absorption is usually sufficiently rapid at room temperature, but the getter may be heated slightly, for example, to 100°–200° C., if faster absorption is desired.

Since the getter must be located inside the sealed block of the ring laser gyroscope and the heater power source is typically outside the block, a method must be found for transmitting such power to the inside. Several methods are known and are presently in use. In one method, a ring-shaped getter is disposed inside the cavity. An RF coil is disposed outside the cavity in a coaxial relation with the getter. Electrical RF oscillations in the coil generate an oscillating magnetic field, which in turn induces RF oscillations in the electrically conductive getter. This current flowing around the getter heats it to the desired temperature. The disadvantage of this method lies in the fact that the RF coil heats up all metal objects in its path. The amount of heating depends on the size and shape of the metal object. In some cases springs or other mechanisms used to hold the getter in place will reach their annealing temperature and thus lose the preload required to hold the getter securely in place. Vacuum seals on a ring laser gyroscope are especially prone to failure under RF excitation since they are commonly made with metals which have low melting points. It can be seen that RF excitation of getters places significant restrictions on the design of ring laser gyroscopes.

The alternate approach to activation of getters lies in heating them via electrical heater coils embedded in the getter material. Glass-insulated feedthroughs are used to transmit electrical current to the interior of the block. A heater coil is disposed inside the getter and is electrically connected to the feedthroughs by welding. The heater coil is usually made from tungsten or Kanthal and is coated with alumina or magnesia to electrically insulate it from the electrically conductive getter body. Since power to heat the getter is brought inside the block in the form of electrical current, a getter heated in this manner is known as an electrically fired getter.

In the past, electrically fired getters have commonly been supported only by their electrical heater wires. The heater wires provided a convenient support to keep the hot getter from touching the walls of its container. While adequate for some applications this approach is problematic in the high stress environments in which ring laser gyroscopes are frequently operated. The heater wire and its attachment to the glass-insulated feedthroughs are flexible and prone to fracture. Mechanical forces acting on the heater can dislodge the alumina or magnesia insulation, thereby exposing the heater to the risk of a short circuit. In addition, acceleration forces may fracture the tungsten wire element, which can become brittle in the high heat of firing. Finally, acceleration forces may cause the getter to vibrate due to the compliance of its support wires. When the getter and its supports are vibrated at their natural frequency the resulting motion can be so violent as to tear the getter loose or to shake particles from the sintered getter material. Any particle (microscopic of otherwise) broken off the getter can degrade the performance of the ring laser gyroscope.

In order to use an electrically fired getter in the acceleration and vibration environments to which ring laser gyroscopes are frequently subjected it is necessary to mechanically support the getter such that the structure has a natural frequency well above 2 kHz. This support structure must contact the getter without acting as a heat sink to the getter while it is being activated to 900° C. It also must not lose its preload or tension as a result of being in contact with a 900° C. object.

SUMMARY OF THE INVENTION

It is an object of the present invention to provide a retainer for an electrically fired getter so as to avoid the above-mentioned disadvantages.

It is another object of the present invention to provide a mousetrap shaped spring to hold an electrically fired getter against an inside surface of a ring laser gyroscope block.

It is yet another object of the present invention to provide a retainer for an electrically fired getter which does not conduct an appreciable amount of heat away from the getter during firing.

It is a further object of the present invention to provide a V-shaped groove in an inner surface of a ring laser gyroscope block.

It is yet a further object of the present invention to provide a spring-loaded means for retaining an electrically fired getter against an inner wall of a ring laser gyroscope block, which means maintains its loading when the getter is fired.

In accordance with the invention, a cylindrical getter body is preloaded against an inside surface of the ring laser gyroscope block by a mousetrap shaped spring. The spring is configured such that the section of the spring generating the preload will not be annealed or in any way affected by the 900° C. temperature of the getter. The preload is constant and can be far greater than any acceleration force likely to be present. The getter rests longitudinally in a V-shaped groove cut into the wall so that the getter physically contacts the wall along only two lines. This type of contact in a vaccuum environment has been found to maintain very low thermal conductivity between the getter and the groove. This allows the getter to be rigidly loaded against the wall without affecting the activation of the getter. The mousetrap shaped spring is held against the wall by a thin yoke which passes longitudinally through both coils of the spring and is welded on both ends to the wall. The entire apparatus, including the glass insulated electrical feedthroughs, may be assembled on a stepedged disk and mounted in a pluglike fashion in a hole in the gyroscope block drilled for that purpose.

As used herein, the gyroscope cavity includes any volume in communication with the lasing gas, including volumes not immediately adjacent to the optical path of the gyroscope. The walls of the cavity shall be deemed to include any surface which is physically coupled to the gyroscope block and is in communication with the cavity, including inward protrusions.

BRIEF DESCRIPTION OF THE DRAWINGS

The above-mentioned objects and advantages of the present invention will be more clearly understood by reference to the accompanying drawings, in which.

DETAILED DESCRIPTION OF THE INVENTION

Figure 1:
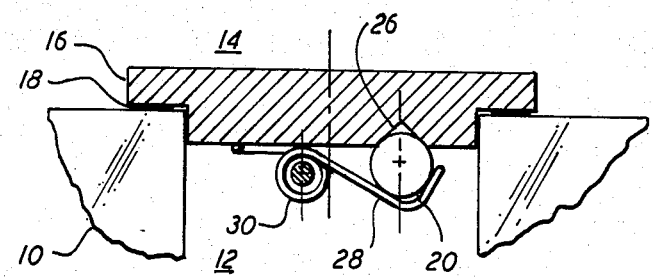
FIG. 1 shows a cross-section of a getter assembly according to the invention.
Figure 2:
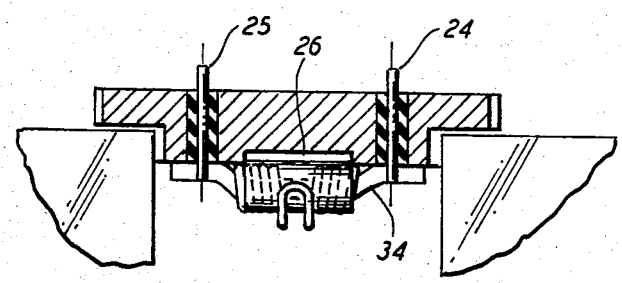
FIG. 2 shows a cross-section of the getter assembly of FIG. 1, rotated 90 degrees.
Figure 3:
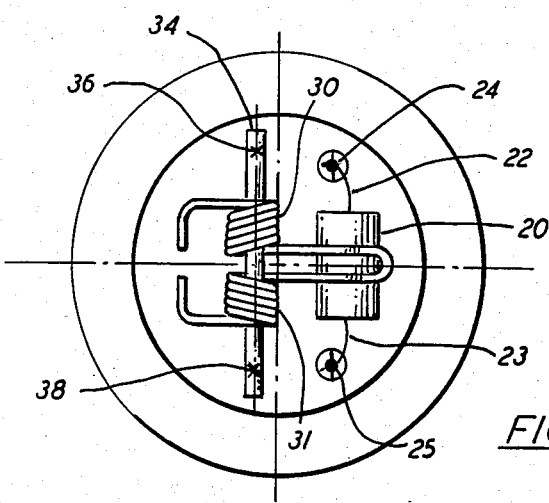
FIG. 3 shows a plan view of the getter assembly of FIG. 1.

An embodiment of the invention will now be described with reference to the accompanying drawings, throughout which like parts are designated by like numerals.

Designated at 10 is a portion of a wall of a triangular ring laser gyroscope block. The wall contains a circular hole connecting the interior 12 of the block with the exterior 14. A step-edged disk 16 hermetically seals the hole in a pluglike manner with the larger diameter portion of the disk remaining outside the hole and the smaller diameter portion just inside. The seal may be accomplished by any suitable method, but an indium compression seal as described in commonly assigned U.S. Pat. No. 4,159,075 is preferred. In this method, the surfaces are cleaned and pressed together with an indium wire 18 sandwiched between them to form an hermetic seal.

Designated at 20 is a nonevaporative electrically fired getter for use with the present invention. It is cylindrical in shape and can be made from a zirconiumtitanium alloy. It is sintered with graphite in order to make it porous. Imbedded inside the getter 20 is a heater coil (not shown), which may be made from tungsten or Kanthal and coated with alumina or magnesia for electrical insulation. The heater coil terminates in axially disposed leads 22 and 23 which are welded to glass-insulated feedthroughs 24 and 25, respectively, and which provide current paths to the exterior 14 of the ring laser gyroscope.

The getter is disposed longitudinally in a V-shaped groove 26 cut into the surface of the disk 16 in communication with the interior 12 of the gyroscope. It will be recognized that the groove 26 need not have a V-shape, and may be formed using raised walls instead of a cut-out. This arrangement rigidly supports the getter, yet accomodates the natural thermal expansion which occurs during firing. Moreover, the portion of the getter surface which makes physical contact with the disk 16 is extremely small, being limited to only two lines extending the length of the cylinder. Heat conduction from the getter into the disk is therefore very small and is in fact dominated by the radiative heat transfer. Tests show that when a getter supported in this manner is heated to 900° C. in a few seconds, the disk 16 remains at approximately 80° C. when surrounded by still air.

The getter 20 is held against the V-groove 26 by a mousetrap shaped preloading spring 28. The spring comprises two connected wire coils 30 and 31 wound in opposite directions on a common axis and longitudinally spaced from each other. The portion of the wire which connects the two coils is formed into a U-shape, the sides of which extend in a direction perpendicular to the winding axis of the coils 30 and 31. At an appropriate point on both sides of the "U", the arm is bent approximately 90 degrees so as to form a proper shape for retaining the getter. The two opposite ends of the spring wire also extend in a direction perpendicular to the winding axis of the coils 30 and 31. The ends are then bent toward each other to form L-shapes. Longitudinally through the center of the coils 30 and 31 is disposed a thin yoke 34 which is spot-welded at its two ends 36 and 38 to the disk 16. It is not necessary that the welds be at the ends of the yoke, as long as there is one on each end of the coil. This yoke serves to hold the coils against the disk surface while the L-shaped ends and U-shaped center exert force from opposite sides of the coils against the disk. The spring 28 can be made from any suitable material, such as cold drawn 300 series corrosion resistant steel, and should be designed to provide a constant preload on the getter 20 greater than the acceleration forces to which it will be subjected.

One advantage of a mousetrap shaped spring is that it is substantially immune from the annealing effect of the heat generated in the getter during firing. The only part of the spring which sees the high getter temperature is the U-shaped arm, which functions merely to transfer the spring force from the coils to the getter of the spring. It can be annealed without affecting the clamping energy of the spring. The coils, on the other hand, which store most of the energy of the spring, are spaced from the getter and thus do not see the high temperature. They are also in contact with other metal parts which act as a heat sink to draw away heat which does reach the coils.

The retainer as described above has been built and subjected to firing tests and vibration sweep testing at an amplitude of 10 g in three mutually perpendicular directions. No particles have broken off either the getter or the heater, nor have any resonances been found.

The invention has been described with respect to a particular embodiment thereof, and it will be recognized that many modifications are possible without departing from the scope of the invention. For example, the mousetrap shape of the spring is not crucial to the invention and may be replaced by a spring in a different shape which accomplishes the same function. Additionally, the spring may be made of a material different from that described above. As another example, the apparatus may be mounted on a plate without step-edges, or having a non-disklike shape. It may also be mounted directly on an inner surface of the optical cavity. Other modifications, too, are possible within the scope of the invention.

What is claimed is:

1. In a ring laser gyroscope comprising a block having a cavity therein, an electrically fired getter in the cavity, the getter having a heater coil, feedthroughs for transmitting electrical current from the outside to the inside of the cavity, and wires for connectng the heater coil to the feedthroughts, the improvement comprising means for retaining the getter in a position substantially stationary with respect to the block, wherein the means for retaining comprises;

a spring having an axis of symmetry and having a coil disposed symmetrically about said axis, said spring having an elongate U-shaped portion with a first arm portion and a second arm portion symmetrically disposed about said axis of symmetry for bearing on said getter, said coil having a first coil portion fixedly connected to said first arm portion and having a second coil portion fixedly connected to said second arm portion, said first coil portion having a first end portion, and said second coil portion having a second end portion, said end portions being arranged to bear against a wall of said cavity for resisting a twisting moment on said coil; and means for holding the coil against the wall of the cavity.

2. The improvement according to claim 1, wherein the means for holding comprises a yoke disposed longitudinally through the inside of the coil and fastened at both ends of the coil to the wall.

3. The improvement according to claim 1 wherein the getter is substantially cylindrical in shape, and wherein the means for retaining comprises an area on the wall of the cavity having a groove formed thereon, the groove being at least as long as the getter, so that the getter can rest longitudinally in the groove and contact the wall at an inner surface thereof along only two lines.

4. The improvement according to claim 1, wherein the spring preloads the getter and the coil is at least partially thermally insulated from the getter, which coil stores sufficient spring energy to prevent its retaining force from dropping below a desired level when the getter is heated to a predetermined temperature and simultaneously is subjected to an acceleration force.

5. The improvement according to claim 1, wherein:
the coil is axially spaced from the getter, which coil stores a portion of the spring energy sufficient by itself to generate a desired retaining force; and
the U-shaped portion transmits such spring energy to the getter.

6. The improvement according to claim 1, wherein the wall has a removable plate with an inner face and an outer face and wherein the edges of the plate are stepped such that the area of the outer face exceeds that of the inner face and wherein the plate is integral with the ring laser gyroscope block, and wherein the plate is attached to the ring laser gyroscope block usig an indium wire compression seal.

7. A method for retaining an electrically fired getter in a substantially fixed relationship with respect to a ring laser gyroscope block, comprising the steps of:
disposing the getter inside the gyroscope cavity;
preloading the getter against a wall of the cavity;
providing a plate having an inner face and an outer face;
preloading the getter against the inner face so as to make line contact therewith;
forming a groove on the inner face, which groove is at least as long as the getter;
disposing the getter longitudially in the groove;
forming a hole in the block;
covering the hole with the plate, the plate being oriented so that the inner face faces the inside of the cavity; and
hermetically sealing the plate to the block.

* * * * *